United States Patent
Decombaz et al.

(10) Patent No.: US 6,488,955 B1
(45) Date of Patent: Dec. 3, 2002

(54) NUTRIENT COMPOSITION FOR EXERCISE

(75) Inventors: Jacques Decombaz, Lausanne (CH); Hubert Milon, Cugy (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/068,710

(22) PCT Filed: Jan. 27, 1997

(86) PCT No.: PCT/EP97/00448

§ 371 (c)(1),
(2), (4) Date: Jul. 30, 1998

(87) PCT Pub. No.: WO97/28700

PCT Pub. Date: Aug. 14, 1997

(30) Foreign Application Priority Data

Feb. 9, 1996 (EP) .............................................. 96200301

(51) Int. Cl.$^7$ .......................... A61K 47/00; A61K 9/28; A61K 9/68; A61K 31/715
(52) U.S. Cl. ........................ 424/439; 424/440; 424/441; 514/54
(58) Field of Search ................................ 424/439, 440, 424/441; 514/54

(56) References Cited

U.S. PATENT DOCUMENTS

| | | | |
|---|---|---|---|
| 4,497,840 A | | 2/1985 | Gould et al. ................. 426/560 |
| 4,689,229 A | * | 8/1987 | Banik ....................... 424/195.1 |
| 4,832,971 A | * | 5/1989 | Minchnowski .............. 426/302 |
| 4,871,557 A | * | 10/1989 | Linscott ........................ 426/93 |
| 4,962,094 A | * | 10/1990 | Jamas et al. ................... 514/54 |
| 5,106,640 A | * | 4/1992 | Lehtomaki et al. .......... 426/436 |
| 5,169,662 A | | 12/1992 | Spicer ......................... 126/447 |

FOREIGN PATENT DOCUMENTS

| | | | |
|---|---|---|---|
| EP | 0 444 891 | 9/1991 | |
| EP | 0444891 | * 9/1991 | ............. A23L/1/30 |
| EP | 0 504 055 | 9/1992 | |
| EP | 0 582 518 | 2/1994 | |
| WO | WO 92/10106 | 6/1992 | |

OTHER PUBLICATIONS

Friedman, Diet and the irritable bowel syndrome, AN 91293864 Medline, see abs., Jun. 1991.*
Laurin, D. et al. J. Can Dent Assoc. 1994 May; 60(5):443–6 (Pub. Med. abstract).*
Braaten et al. "Oat gum lowers glucose and insulin after an oral glucose load," Am. J. Clin. Nutr. 1991, vol. 53, p. 1425–30 .*
Medline Abstract, AN 87103942, 1987, Vandenplas et al.*

* cited by examiner

Primary Examiner—Russell Travers
Assistant Examiner—Shengjun Wang
(74) Attorney, Agent, or Firm—Bell, Boyd & Lloyd LLC

(57) ABSTRACT

A method of maintaining raised blood glucose levels in a mammal during excise, preventing or delaying the onset of hypoglycemia during excise. The method includes step of orally administering to the mammal a nutrient composition containing a carbohydrate source and at least 9% by weight beta-glucan.

23 Claims, 1 Drawing Sheet

NUTRIENT COMPOSITION FOR EXERCISE

This application is a 371 of PCT/EP97/00448, filed Jan. 27, 1997, which claims the foreign priority of EP 96200301.8, filed Feb. 9, 1996.

This invention relates to a nutrient composition which may be used to maintain raised blood glucose levels for extended periods during exercise and which reduces acid reflux symptoms. The invention also relates to methods of maintaining raised blood glucose levels for extended periods, methods for the prevention of hypoglycaemia, methods for increasing exercise performance and methods for reducing acid reflux symptoms; especially in athletes.

Humans, during exercise, obtain the energy necessary for the exercise predominantly from two sources; carbohydrates and lipids. However, the rate at which energy is supplied to muscles through carbohydrates is 3 to 4 times higher than for lipids: making carbohydrates an extremely important source of energy for athletes.

During exercise, carbohydrates are supplied to the muscles either in the form of blood glucose or muscle glycogen. The availability of carbohydrates from these sources is very dependent upon exercise intensity and duration. However during exercise of high intensity, muscle glycogen is consumed first and rapidly. This requires that sufficient blood glucose be present as an energy source for continued performance. For this reason, athletes often ingest large quantities of carbohydrates before and during exercise.

Unfortunately, the ingestion of carbohydrates results in a blood glucose peak shortly after ingestion; along with a concomitant peak in blood insulin. This is then followed by an equally rapid drop in blood glucose levels. If the drop is sufficiently large, reactive hypoglycaemia and its associated unpleasant symptoms will result. Further, fatigue may rapidly set in; greatly reducing exercise performance.

Further, many athletes who subject themselves to severe training suffer from gastro-oesophageal acid reflux; a condition which has extremely unpleasant symptoms. The condition is believed to arise from delayed gastric emptying and excessive oesophageal pressure. In severe cases, symptoms include vomiting of blood.

It is therefore an object of this invention to provide an energy source which is capable of maintaining raised blood glucose levels for extended periods. It is a further object of this invention to provide an energy source which prevents or reduces the occurrence of gastro-oesophageal acid reflux.

Accordingly, in one aspect, this invention provides a method of maintaining raised blood glucose levels in a mammal during exercise, the method comprising orally administering to the mammal a nutrient composition containing carbohydrate and soluble fibre.

In another aspect, this invention provides a method of preventing or delaying the onset of hypoglycaemia during exercise, the method comprising orally administering to the mammal a nutrient composition containing carbohydrate and soluble fibre.

In a further aspect, this invention provides a method of preventing or reducing acid reflux symptoms in a mammal, the method comprising orally administering to the mammal a nutrient composition containing carbohydrate and soluble fibre.

In a yet further aspect, this invention provides the use of carbohydrate and soluble fibre in the preparation of an orally administrable nutrient composition for the maintenance of raised blood glucose levels in a mammal during exercise, the prevention or delay of the onset of hypoglycaemia in a mammal during exercise, or the prevention or reduction of acid reflux symptoms in a mammal.

The invention also provides a nutrient composition for the maintenance of raised blood glucose levels in a mammal during exercise, the prevention or delay of the onset of hypoglycaemia in a mammal during exercise, or the prevention or reduction of acid reflux symptoms in a mammal, the nutrient composition comprising carbohydrate and soluble fibre.

Figure 1:
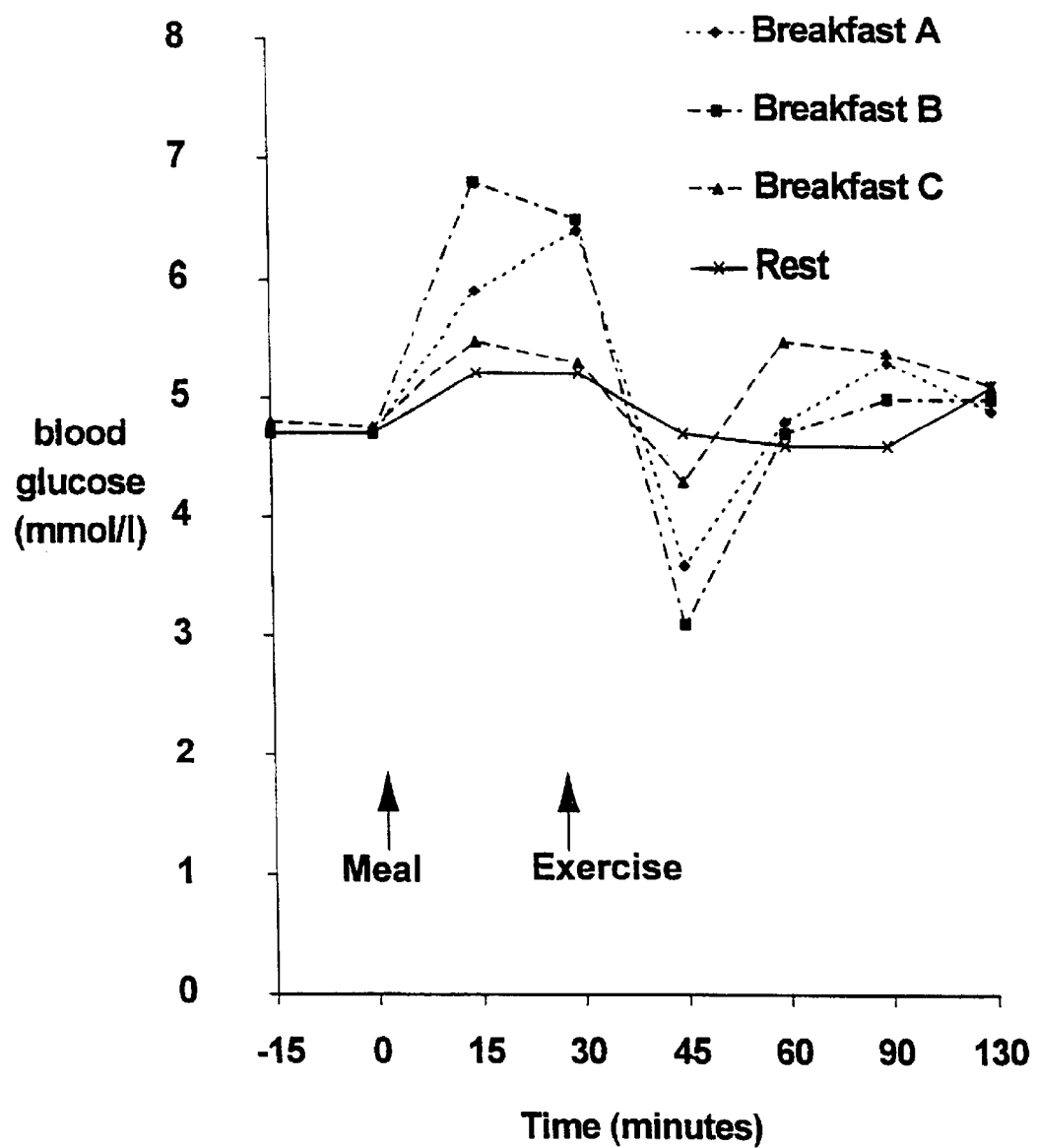
FIG. 1 illustrates, graphically, blood glucose levels versus time for three breakfasts as well as at rest, pursuant to Example 2.

Surprisingly, it is found that administering a nutrient composition which contains carbohydrate and an effective amount of soluble fibres to a mammal results in a relatively small increase in the blood glucose of the mammal and that this raised level of blood glucose is maintained for extended periods during exercise. This prevents or delays the onset of hypoglycaemia during exercise. Also, the onset of fatigue is delayed which enables an increase in performance. If a nutrient composition containing an equivalent amount of carbohydrate, but without soluble fibre, is administered, the blood glucose levels of the mammal rapidly increase to a peak and then rapidly decrease upon onset of exercise to well below base blood glucose levels. In these circumstances, hypoglycaemia may rapidly result along with fatigue and reduced performance.

It is also surprisingly found that orally administering a nutrient composition which contains carbohydrate and an effective amount of soluble fibre prevents or delays the onset of the symptoms of acid reflux.

Preferably the nutrient composition contains at least 2% by weight soluble fibre: more preferably at least 5% by weight soluble fibre; for example about 8 to about 15% by weight soluble fibre.

The nutrient composition preferably contains up to about 60% by weight of carbohydrate; more preferably about 40% to about 55% by weight of the carbohydrate source; for example about 45% to about 55% by weight.

The nutrient composition may also include fats; preferably up to about 20% by weight of fats; more preferably about 8 to about 18% by weight fats. For example, the nutrient composition may include about 10% to about 15% by weight fats.

The nutrient composition preferably has up to about 20% by weight of protein; more preferably about 8 to about 18% by weight protein. For example, the nutrient composition may include about 10% to about 16% by weight protein.

Preferably the nutrient composition includes a fibre rich cereal which provides carbohydrate and the soluble fibre. Preferably the fibre rich cereal contains at least about 10% by weight of soluble fibre and at least about 25% by weight of total fibre. More preferably the fibre rich cereal contains at least about 14% by weight soluble fibre and at least about 30% by weight of total fibre. The fibre rich cereal is preferably an oat bran concentrate or a barley flour; more preferably a de-fatted oat bran or barley flour.

The fibre rich cereal is preferably provided in the form of an extrusion cooked cereal. In this form, the fibre rich cereal has the advantage that it is in a ready to eat form and has acceptable taste and texture. Preferably the nutrient composition is in the form of a ready to eat snack bar.

The nutrient composition is preferably administered from about 2 hours to about 15 minutes prior to commencing exercise. The nutrient composition may also be conveniently administered during exercise or during rest periods in exercise of longer duration.

The amount of nutrient composition administered is preferably sufficient to provide about 0.03 g to about 0.3 g per kg body weight of soluble fibre; more preferably about 0.05 g to about 0.2 g per kg body weight of soluble fibre. For example, the amount of soluble fibre administered may be about 0.07 g about 0.15 g per kg of body weight. The amount of carbohydrate administered is preferably sufficient to meet energy needs, for example about 0.3 g to about 1.5 g per kg body weight. More preferably about 0.8 g to about 1.2 g per kg body weight of carbohydrate are administered.

Embodiments of the invention are now described, by way of example only, with reference to the drawing which is a graph of blood glucose levels in athletes plotted against time after consumption of different meals having the same carbohydrate content. Breakfast A is a maltodextrin solution. Breakfast B is a mixture of maltodextrin solution and snack bars containing soluble fibre, and Breakfast C is made up of snack bars containing soluble fibre. Certain athletes remain at rest and are fed Breakfast C.

To produce the nutrient composition, a soluble fibre source is required. Any suitable source of soluble fibre may be used. However, the source of soluble fibre is conveniently selected to be compatible with the form of the nutrient composition desired. For example, if the nutrient composition is to be in the form a breakfast cereal, a snack bar, a cookie, a biscuit, a cracker, a bread or bread-like product, etc, the soluble fibre is conveniently provided in the form of a fibre rich cereal or a fibre rich bean concentrate.

For convenient, ready-to-eat foods such as snack bars, the soluble fibre is best provided in the form of a fibre rich cereal. For simplicity, the invention will be described in detail in relation to the use of fibre rich cereals as a soluble fibre source. However, it will be appreciated that the invention is not limited to the use of fibre rich cereals. For other sources of soluble fibre, procedures known in the art may be used to produce the nutrient compositions.

For best results when using a fibre rich cereal, the fibre-rich cereal has a total fibre content of at least 25% by weight and a soluble fibre content (the soluble fibre being predominantly β-glucan) of at least 10% by weight. The fibre rich cereal may be any suitable cereal; for example oat or barley. Particularly suitable is oat bran concentrate but barley flours (for example obtained from Conagra Inc. of Omaha, Nebr., USA) are also suitable. Most preferred are de-fatted oat bran concentrates.

In this specification, a "de-fatted oat bran concentrate" means an oat bran fraction which has a soluble fibre content of above about 10% by weight and which has been subjected to solvent extraction to remove, at least partially, oils and fats from the fraction. Ordinarily, oat bran concentrates have a fat or oil content of greater than about 10% by weight. De-fatted oat bran concentrates have an oil or fat content of less than about 7% by weight: more usually about 4% to about 6% by weight. De-fatted oat bran concentrates offer the advantage of better stability of the nutrient composition, easier processing, and improved texture and organoleptic properties of the nutrient composition.

De-fatted oat bran concentrates of this type are commercially available; for example suitable oat bran concentrates may be purchased from Swedish Protein AB. Väröbacka, Sweden. Alternatively the oat bran concentrate may be prepared by grinding dry oat grains and then carefully screening the fibre material from the starchy components of the oat grains. The fibre rich material may then be subjected to solvent extraction techniques to remove oils and fats from the material. A suitable procedure for the extraction of oils and fats is disclosed in British patent 1,526,553; the disclosure of which is incorporated by reference. The solvent extraction step may also be carried out prior to screening if desired. This screening and extraction procedure would be suitable for producing oat bran concentrates with fibre contents at the lower end of the range; for example an oat bran concentrate having a maximum soluble fibre content of about 15% by weight.

As an alternative, the process described in U.S. Pat. No. 5,106,640 (the disclosure of which is incorporated by reference) may be adapted to produce the de-fatted oat bran concentrate. In this process, oat grains are rapidly ground in slurry form at a temperature of 0 to 15° C. The slurry is then homogenised and then screened to separate off a fibre rich fraction. The fibre rich fraction may then be subjected to extraction to remove oils and fats. Using this technique, oat bran concentrates having a soluble fibre content of up to about 40% by weight may be prepared. Although oat bran concentrates having very high soluble fibre contents may be used to produce the nutrient composition, it is preferred if the soluble fibre content is less than about 20% by weight.

To produce the nutrient composition, a dry mix containing the fibre rich cereal is formed. The dry mix will comprise at least 50% by weight of the fibre rich cereal; the exact amount depending upon the desired form and desired properties of the nutrient composition.

If it is desired to produce an expanded nutrient composition, the dry mix will usually also contain a starchy, farinaceous ingredient or a starch, or both. Any suitable starchy farinaceous ingredient may be used. Suitable examples are wheat flour, rice flour, corn flour, barley flour, oat flour, and rye flour. Also mixtures of these flours may be used. The flours may be whole flours or may be flours which have had fractions removed; for example the germ fraction or husk fraction may be removed. Rice flour and wheat flour are particularly suitable; either alone or in combination. For example, up to 40% by weight of the starchy, farinaceous ingredient or starch may be used although adequate expansion may be obtained with lower amounts of the starchy, farinaceous ingredient or starch.

The amount of the starchy, farinaceous ingredient or starch that is used is selected to provide the desired properties in the nutrient composition. However it is best that the soluble fibre content of the nutrient composition is above about 5%. If it is desired to provide a highly expanded product, greater amounts of the starchy, farinaceous ingredient or starch will be needed. In this case, the soluble fibre content of the nutrient composition may be maintained above about 5% by weight by using an oat bran concentrate with a high soluble fibre content. However, for a oat bran concentrate which has a soluble fibre content in the range of about 15 to about 20% by weight, the starchy, farinaceous ingredient or starch conveniently comprises from about 10% to about 30% by weight of the dry mix.

If it is desired to produce a flaked nutrient composition, it is not necessary to use a starchy, farinaceous ingredient or a starch in the dry mix since it is possible to flake an unexpanded product. In any event however, subjecting a dry mix which comprises almost exclusively the oat bran concentrate will result in some expansion. Extensively expanded products may also be flaked.

The dry mix may also include minor amounts, for example less than 5% by weight in total, of flavouring agents, colouring agents, salts, antioxidants, vitamins, minerals, protein sources, malts, and the like. Suitable protein sources are milk powders, whey powders, wheat glutens etc. If desired, further sources of insoluble fibre may also be included; for example wheat bran, corn bran, rice bran, rye bran and the like.

The various ingredients of the dry mix are then mixed to provide a homogeneous mix and are then fed to a suitable cooker to increase the palatability of the fibre rich cereal; for example an extruder-cooker. Any suitable extrusion cooker may be used; single crew or twin screw. Suitable extrusion cookers may be commercially obtained; for example the Wenger and Clextral extrusion cookers which are widely available and well known in the art. Twin screw extruders which have co-rotating and inter-penetrating screws are particularly suitable.

Water is also fed into the extruder-cooker, usually into the second zone of the extruder-cooker, to enable gelatinisation of starch components. The water may be at a temperature of about 20° C. to about 60° C. The amount of water used may be selected as desired but preferably makes up less than about 25% by weight of the total weight of the water and dry ingredients. If too much water is used, it is found that the end product becomes very hard and dense. Although this may not be too serious if the end product is to be flaked, it is best avoided if the end product is to used in expanded form. For expanded nutrient compositions, the amount of added water used is preferably less than 15% by weight of the total weight of the water and dry ingredients; for example about 10% by weight. Steam may also be used in place of water.

If desired, a very small amount of an edible oil may be fed into the extruder-cooker to facilitate the extrusion process or as carriers for oil soluble additives. Any suitable oil may be used; for example vegetable oils such as sunflower oil, safflower oil, corn oil, and the like. If oils are used, oils which are high in mono-unsaturates are particularly preferred. Hydrogenated oils or fats are also preferred. The amount of oil used is preferably kept below about 1% by weight of the mixture of oil, dry mix and water.

The rotational speed of the screw or screws is preferably kept below about 500 rpm. Above about 500 rpm, it is found that the soluble fibres are degraded due to the high shear and the end product produces lower viscosities in the stomach and small intestine. Rotational speeds in the range of about 200 rpm to about 450 rpm are suitable; particularly rotational speeds in the range of 250 to 350 rpm.

The pressure in the shear and compression zones of the extruder-cooker is preferably kept below about 200 bars; for example a pressure in the range of about 100 to about 180 bars would be suitable. Particularly advantageous are pressures in the range of about 120 bar to about 140 bar.

The maximum product temperature in the extruder is preferably kept below about 200° C.; for example in the range of about 80° C. to about 200° C. Particularly preferred are maximum product temperatures in the range of about 120° C. to about 190° C.; for example about 150° C. to about 180° C.

Upon leaving the extruder-cooker, the nutrient composition is conveniently cut into small pieces using rotating blades at the exit. Depending upon the conditions in the extruder-cooker, the nutrient composition expands to a greater or lesser extent. The nutrient composition intended to be flaked may, if desired, undergo much less expansion. Of course, it is possible to flake a highly expanded product but there is no advantage in doing this.

If a flaked product is to be produced, the nutrient composition may then be transferred to a flaking apparatus. Suitable apparatus are well known and widely used in the cereal industry and may be purchased from, for example, Buhler AG in Switzerland. If desired, the nutrient composition may be partially dried before flaking.

The expanded nutrient composition or the flaked nutrient composition is then dried to a moisture content below about 5% by weight. This is conveniently carried out in a hot air drier as is conventional. Moisture contents of about 1% to about 3% by weight are preferred. The expanded nutrient compositions produced in this way have a crispy, pleasant texture and good organoleptic properties. The flaked nutrient compositions also have good texture and organoleptic properties but are less crispy. The nutrient compositions have a pleasant taste of toasted cereal. The density of the nutrient compositions is conveniently less than about 300 g/l.

The nutrient composition may then be further processed as desired. For example, if the nutrient composition is to be used as a breakfast cereal, it may be sprayed with a syrup which contains sugars (such as fructose or glucose) or other sweeteners, colouring agents, or flavouring agents, and the like, and then dried. Then, if desired, dried fruit, nuts, other cereals, dried milk produce (such as dried yoghurt etc) may be dried mixed with or agglomerated with the coated nutrient composition.

Alternatively the nutrient composition may be formulated into a convenience food such as a snack bar, a cookie, a biscuit, a cracker, a muffin and the like. Again the nutrient composition may be mixed with nuts, dried fruit, sugars or other sweeteners, colouring agents, or flavouring agents, and the like. To produce a snack bar, a suitable binder, for example arabic gum or gelatine, may then be added. An agent which reduces breakability of the bar may also be included; for example hydrolysed wheat. If desired, the bar may be coated with a suitable coating; for example chocolate. Processes for manufacturing snack bars are well known and are described in the art; see for example U.S. Pat. No. 4,871,557.

The nutrient composition, when eaten, results in a smaller increase in blood glucose levels than other food compositions which contain an equivalent amount of carbohydrates but no soluble fibre. However, the raised blood glucose levels induced by the nutrient composition remain substantially constant over extended periods in comparison. In particular, little noticeable decrease in blood glucose levels occurs upon onset of exercise. Consequently the onset of hypoglycaemia may be prevented or delayed for significant periods of time. Further the onset of fatigue may be delayed: increasing exercise performance. Further the symptoms associated with acid reflux are prevented or reduced.

The amount of the nutrient composition to be administered will vary depending upon the age, health and fitness of the individual, the body weight of the individual, the amount of carbohydrate and soluble fibre in the nutrient composition, the duration of the exercise, and the like. In any event, the correct amount for any individual may be rapidly determined by the individual or a medical practitioner. However, for exercise of duration up to about 1 to 2 hours, an amount of nutrient composition sufficient to supply a dose of about 0.03 g to about 0.3 g per kg body weight of soluble fibre is usually adequate. More preferably about 0.05 g to about 0.2 g per kg body weight of soluble fibre is administered; for example, the amount administered may be about 0.07 g about 0.15 g per kg of body weight.

The amount of carbohydrate administered is sufficient to meet the energy needs of the user, for example a dose of about 0.3 g to about 1.5 g per kg body weight of carbohydrate for exercise of duration up to about 1 to 2 hours would be adequate for most purposes. A dose of about 0.8 g to about 1.2 g per kg body weight of carbohydrate is preferred.

The nutrient composition may be taken in single or multiple doses prior to commencing exercise; for example about 2 hours to about 15 minutes prior to commencing exercise. This is particularly suitable for exercise of shorter duration; for example less than about 2 hours. Alternatively, the nutrient composition may be taken in multiple doses prior to and during exercise. For example, if the individual is exercising over extended periods (for example, more then 10 hours), the nutrient composition may be taken prior to commencing exercise, during rest periods (if any) and during exercise if the individual is comfortable with consuming food during exercise.

EXAMPLE 1

A dry mixture of about 82.4% de-fatted oat bran concentrate, about 15.6% wheat flour, about 2% powdered malt extract, and minor amounts of salts and colouring agents is prepared. The oat bran concentrate is obtained from Swedish Protein AB, Väröbacka. Sweden and contains about 35% total dietary fibre and about 17% soluble fibre.

The dry mixture and water are fed into an extrusion cooker in a mass ratio of dry ingredients to water of about 4:1. The temperature at the exit of the extrusion cooker is about 122° C. The pressure in the extrusion cooker reaches about 126 bar. The product leaving the extruder orifices is cut into pieces of length of about 2 to 3 mm.

The pieces are then flaked in a flaking apparatus (obtained from Buhler AG, Switzerland) and dried to a moisture content of about 2.3% using air at about 120° C. The dried flaked food product has a crispy, pleasant texture, a dietary fibre content of about 29% and a soluble fibre content of about 14%. The product has a good mouthfeel.

A mixture of wheat flour and rice flour in roughly equal amounts is subjected to extrusion cooking to produced crisp, expanded balls. These crisp balls are then mixed with the flaked food product in a mass ratio of crisp balls to flaked food product of about 1:8. Dried raisins are added to the mixture in a mass ratio of raisins to flaked food product of about 1:2.8. A fructose syrup is prepared from fructose, arabic gum and water and is combined with the crisp balls, the flakes and the raisins. The mixture is formed into bars, cooled and cut into 20 g portions, all in a conventional manner. The bars are then given a chocolate coating to provide individual bars of about 24 g.

The bars have a β-glucan content of about 10% by weight, a protein content of about 11% by weight, a total fibre content of about 20% by weight, a fat content of about 10% by weight, and a carbohydrate content of about 50% by weight. The bars have good taste, texture and mouthfeel.

EXAMPLE 2

Three groups of twelve duathletes, who are regularly competing, are selected for the test. Each member of each group is fed a breakfast containing about 70 g of carbohydrate in the morning; no other food being taken. The breakfast for the first group comprises a maltodextrin solution (breakfast A). The breakfast for the second group comprises 3.8 bars as described in example 1 and a maltodextrin solution to raise the carbohydrates to 70 g (breakfast B). Two thirds of the carbohydrates in breakfast B come from the bars. The breakfast for the third group comprises 5.7 bars as described in example 1 (breakfast C). Each member consumes the same amount of water (4.2 ml/kg).

About 30 minutes after eating the bars, all the athletes who had breakfasts A and B begin to exercise at a sustained pace for 2 hours. Half the athletes who had breakfast C also begin to exercise at a sustained pace for 2 hours. In all cases, the exercise intensity, which is measured at about 51 ml $O_2$/min per kg of body weight, is about 14 to 15 times the basal rate. The other half of the athletes who had breakfast C are allowed to rest as a control.

Blood samples are taken prior to the breakfast and at about 15 minutes, about 30 minutes, about 45 minutes, about 60 minutes, about 90 minutes, about 130 minutes and about 150 minutes after the breakfast. In each case the blood glucose level is determined. The results are presented in FIG. 1.

The athletes who consumed breakfasts A and B experience a sharp increase in blood glucose levels at about 15 minutes after the breakfast. This is then followed by a sharp drop in blood glucose levels about 15 to 20 minutes into the exercise. In some cases, the blood glucose levels are lower than 2.5 mmol/l; a threshold often used as indicative of clinical hypoglycaemia. The athletes who consumed breakfast C experience a small increase in blood glucose levels and a small decrease in blood glucose levels during exercise. The blood glucose levels most closely resemble those of the athletes who are at rest and remain relatively constant and raised.

The athletes are questioned on symptoms of gastrointestinal disturbances but little in the way of adverse symptoms are reported.

EXAMPLE 3

Various types of bar are produced substantially according to the procedure of Example 1. Type 1 contains dried apricots and has a chocolate coating; Type 2 contains hazel nuts and dried apricots and has a chocolate coating; Type 3 contains dried apple pieces and has a chocolate coating; Type 4 contains hazel nuts and dried apple pieces and has a chocolate coating; Type 5 contains raisins and hazel nuts and has a chocolate coating, and Type 6 is the bar of example 1. For all Types, soluble fibre content is about 9% to about 11% by weight, total fibre content is about 19% to about 21% by weight, carbohydrate content is about 40% to about 49% by weight, protein content is about 13% to about 15.5% by weight, and fat content is about 11% to about 17% by weight.

A long distance swimmer is required to swim for 7 days in the Mediterranean. Each day, the swimmer eats breakfast at about 7 am containing about 900 kcal of energy of which about 580 comes from carbohydrates. The breakfast contains no soluble fibre. The swimmer then begins swimming and continues until 8 pm. During the day, the swimmer ingests a snack of 3 bars of Types 1 to 6 and a drink containing 240 kcal of sugar at 11 am. 1.30 pm and about 6 pm. Also the swimmer takes a meal at about 3 pm containing about 480 kcal of energy of which about 280 comes from carbohydrates. The meal contains no soluble fibre. Blood glucose levels are taken at each hour during the day.

After the breakfast and the meal, blood glucose levels increase sharply and then drop equally sharply. The swimmer experiences painful acid reflux symptoms shortly after consuming the breakfast. Blood glucose levels increase slightly or remain reasonably constant after consuming each snack. No sharp decrease in blood glucose levels following consumption of the snack is determined. All acid reflux symptoms terminate upon consumption of the first snack at 11 am.

EXAMPLE 4

The Type 1 bar of example 3 is used. The bar has a soluble fibre content of about 10% by weight, a total fibre content of about 20% by weight, a carbohydrate content of about 46% by weight, a protein content of about 14% by weight, and a fat content of about 11% by weight.

Eight competitive cross-country skiers take part in the test. Each skier is fed a standard breakfast of about 830 kcal and then, 3 hours later, three bars of Type 1 making up about 210 kcal in energy. About 30 minutes after consuming the bars, the skiers are each required to ski a 2 km circular course 8 times. Cardiac frequency is measured and blood samples are taken at 180 and 30 minutes prior to commencing skiing, upon commencing skiing and 60, 90 and 120 minutes after commencing skiing. Blood glucose levels are determined from the blood samples. The time for each skier to complete 8 circuits is determined.

The test is repeated twice; in one repeat the bars are substituted by a commercial muesli bar in an amount sufficient to provide about 210 kcal in energy. In the other repeat no bars are given. A cross-over design is used for all three tests.

Blood glucose levels remain reasonably constant after consumption of the commercial bar and the bars of Type 1. Blood glucose levels drop severely after commencing exercise in the test where no bars are consumed. Further results are listed in table 1.

|  | Bar Type 1 | Commercial Bars | No Bars |
| --- | --- | --- | --- |
| Mean completion time(s) | 3093 | 3177 | 3171 |
| Mean Speed (km/h) | 20.48 | 19.92 | 19.95 |
| Mean Energy Cost ($10^{-4}$) | 3232 | 3433 | 3389 |

The mean energy cost is calculated by multiplying the time to complete 8 circuits by the number of heartbeats.

The bars of Type 1 result in much improved performance and a lower energy cost. None of the skiers suffered from acid reflux symptoms after consumption of the bars of Type 1.

What is claimed is:

1. A method of maintaining raised blood glucose levels in a mammal during exercise and/or preventing or delaying the onset of hypoglycemia during exercise in a mammal, the method comprising orally administering to the mammal a nutrient composition containing carbohydrate and at least 9% by weight beta-glucan.

2. The method of claim 1 wherein the nutrient composition contains at most 15% by weight beta-glucan.

3. The method of claim 1 wherein the nutrient composition contains up to 60% by weight of carbohydrate.

4. The method of claim 1 wherein the nutrient composition contains 45% to 55% by weight of carbohydrate.

5. The method of claim 1 wherein the nutrient composition further comprises 8% to 18% by weight fats.

6. The method of claim 1 wherein the nutrient composition comprises 8% to 18% by weight protein.

7. The method of claim 1 wherein the nutrient composition includes a fibre rich cereal which provides carbohydrate and the β-glucan; the fibre rich cereal containing at least 14% by weight β-glucan and at least 30% by weight of total fibre.

8. The method of claim 7 wherein the fibre rich cereal is in the form of an extrusion cooked cereal.

9. A method of preventing or delaying the onset of hypoglycemia during exercise in a mammal, the method comprising orally administering to the mammal 30 minutes or less before or during the exercise a betaglucan enriched nutrient composition containing carbohydrate wherein the amount of betaglucan is at least 9% by weight of the nutrient composition.

10. The method of claim 9 wherein the nutrient composition contains at most 15% by weight beta-glucan.

11. The method of claim 9 wherein the nutrient composition contains up to 60% by weight of carbohydrate.

12. The method of claim 11 wherein the nutrient composition contains 45% to 55% by weight of carbohydrate.

13. The method of claim 9 wherein the nutrient composition further comprises 8% to 18% by weight fats.

14. The method of claim 9 wherein the nutrient composition comprises 8% to 18% by weight protein.

15. The method of claim 9 wherein the nutrient composition includes a fiber rich cereal which provides carbohydrate and the betaglucan; the fiber rich cereal containing at least 14% by weight betaglucan and at least 30% by weight of total fiber.

16. The method of claim 15 wherein the fiber rich cereal is in the form of an extrusion cooked cereal.

17. A method of improving performance during an exercise, the method comprising orally administering to a mammal during the exercise a beta-glucan enriched nutrient composition containing carbohydrate wherein the amount of beta-glucan is at least 9% by weight of the nutrient composition.

18. The method of claim 17 wherein the nutrient composition contains at most 15% by weight beta-glucan.

19. The method of claim 17 wherein the nutrient composition contains up to 60% by weight of carbohydrate.

20. The method of claim 19 wherein the nutrient composition contains 45% to 55% by weight of carbohydrate.

21. The method of claim 17 wherein the nutrient composition further comprises 8% to 18% by weight fats.

22. The method of claim 17 wherein the nutrient composition comprises 8% to 18% by weight protein.

23. The method of claim 17 wherein the nutrient composition includes a fiber rich cereal which provides carbohydrate and the beta-glucan; the fiber rich cereal containing at least 14% by weight beta-glucan and at least 30% by weight of total fiber.

* * * * *